United States Patent
Lee et al.

(10) Patent No.: US 12,011,651 B2
(45) Date of Patent: Jun. 18, 2024

(54) VIRTUAL GOLF SYSTEM, VIRTUAL GOLF INTRODUCTION IMAGE GENERATION METHOD, AND VIRTUAL GOLF PLAYER INFORMATION CALCULATION METHOD

(71) Applicant: GOLFZON CO., LTD., Seoul (KR)

(72) Inventors: Kyung Yong Lee, Seoul (KR); Bong Ho Song, Seoul (KR); Min Yong Cho, Seoul (KR); Choong Hwan Kim, Seoul (KR); Joo Young Jung, Seoul (KR); Sun Woong Hur, Seoul (KR); In Jun Lee, Seoul (KR)

(73) Assignee: GOLFZON CO., LTD., Seoul (KR)

( * ) Notice: Subject to any disclaimer, the term of this patent is extended or adjusted under 35 U.S.C. 154(b) by 214 days.

(21) Appl. No.: 17/627,134

(22) PCT Filed: Jul. 10, 2020

(86) PCT No.: PCT/KR2020/009133
§ 371 (c)(1),
(2) Date: Jan. 14, 2022

(87) PCT Pub. No.: WO2021/010684
PCT Pub. Date: Jan. 21, 2021

(65) Prior Publication Data
US 2022/0258026 A1    Aug. 18, 2022

(30) Foreign Application Priority Data

Jul. 15, 2019   (KR) .................. 10-2019-0085312
Oct. 11, 2019   (KR) .................. 10-2019-0125940

(51) Int. Cl.
*A63F 13/00*   (2014.01)
*A63B 69/36*   (2006.01)
(Continued)

(52) U.S. Cl.
CPC .......... *A63B 71/0616* (2013.01); *A63B 69/36* (2013.01); *A63B 71/04* (2013.01); *A63B 71/0622* (2013.01)

(58) Field of Classification Search
None
See application file for complete search history.

(56) References Cited

U.S. PATENT DOCUMENTS 11,367,364 B2 *   6/2022   May ................. A61B 5/486
11,673,024 B2 *   6/2023   Omid-Zohoor ....... G16H 40/67
                                                                    434/247
(Continued)

FOREIGN PATENT DOCUMENTS

JP   2010-099464 A   5/2010
KR   10-0970675 B1   7/2010
(Continued)

OTHER PUBLICATIONS

International Search Report for PCT/KR2020/009133 mailed Oct. 20, 2020 from Korean Intellectual Property Office.

*Primary Examiner* — Sunit Pandya
(74) *Attorney, Agent, or Firm* — Revolution IP, PLLC

(57) ABSTRACT

Disclosed are a virtual golf system, a virtual golf introduction image generation method, and a virtual golf player information calculation method capable of providing a separate introduction image showing two or more users so as to be comparable to each other through record information of a virtual golf game of each of a plurality of users who use the virtual golf system before the plurality of users access the system in order to play the virtual golf game, whereby it is possible to induce users' record competition in the virtual golf game and to provide the users with immersiveness and interest in the game.

4 Claims, 8 Drawing Sheets

(51) Int. Cl.
  *A63B 71/04* (2006.01)
  *A63B 71/06* (2006.01)

(56) References Cited

U.S. PATENT DOCUMENTS

| | | |
|---|---|---|
| 2003/0052327 A1 | 3/2003 | Kwasnick |
| 2009/0191929 A1* | 7/2009 | Nicora .................. A63F 13/798 |
| | | 463/3 |
| 2011/0034261 A1 | 2/2011 | Kawaguchi |
| 2011/0250939 A1* | 10/2011 | Hobler .................... A63F 13/61 |
| | | 463/7 |
| 2012/0289351 A1 | 11/2012 | Woo |
| 2013/0041487 A1* | 2/2013 | Messner ............ A63B 24/0003 |
| | | 700/91 |
| 2018/0333630 A1 | 11/2018 | Jang |
| 2018/0350144 A1* | 12/2018 | Rathod .............. G06Q 20/3224 |
| 2022/0001236 A1* | 1/2022 | Mooney .................. G06F 18/00 |

FOREIGN PATENT DOCUMENTS

| | | |
|---|---|---|
| KR | 10-2013-0046306 A | 5/2013 |
| KR | 10-1293710 B1 | 8/2013 |
| KR | 10-1766636 B1 | 8/2017 |
| WO | 2012-169703 A1 | 12/2012 |

* cited by examiner

VIRTUAL GOLF SYSTEM, VIRTUAL GOLF INTRODUCTION IMAGE GENERATION METHOD, AND VIRTUAL GOLF PLAYER INFORMATION CALCULATION METHOD

TECHNICAL FIELD

The present invention relates to a virtual golf system configured such that a virtual golf course is implemented as an image and such that the trajectory of a golf ball directly hit by a user is implemented as a simulation image on the virtual golf course, whereby the user enjoys virtual golf, and a virtual golf introduction image generation method and a virtual golf player information calculation method using the same.

BACKGROUND ART

With the recent upsurge in the number of golfers, a so-called screen golf system, which enables a golfer to practice golf and to play a round of virtual golf using a virtual golf simulation apparatus, has gained popularity.

The screen golf system is a system that senses the velocity and direction of a golf ball that a golfer hits onto a screen installed indoors to display a virtual golf course and displays the progress of the golf ball on the screen. The screen golf system enables a user to feel the same realism that the user feels when playing a round of golf on an actual golf course, which exceeds the level of enjoyment of a golf game that is simply played indoors. For these reasons, the number of users who enjoy screen golf has increased considerably, in addition to users who play rounds of golf on an actual golf course.

It is necessary for the screen golf system implemented by the virtual golf simulation apparatus to provide the same sense of realism that golfers feel when the golfers play a round of golf on an actual golf course and to provide various kinds of content that is difficult to provide in actual golf course or a golf driving range due to characteristics thereof in that screen golf is implemented through various high-technology apparatuses and systems such that the golfers are interested in screen golf.

In the conventional screen golf system, however, technical development has been performed only in connection with sensing accuracy of a sensing device, rapid calculation, and provision of reality in a golf game, and development of content that induces interest of users who enjoy screen golf by providing various services to the users has been relatively neglected.

Prior Art Documents related to the present invention are as follows:
US Patent Application Publication No. 2009-0191929
US Patent Application Publication No. 2003-0052327
Korean Registered Patent No. 10-1293710

DISCLOSURE

Technical Problem

It is an object of the present invention to provide a virtual golf system, a virtual golf introduction image generation method, and a virtual golf player information calculation method capable of providing a separate introduction image showing two or more users so as to be comparable to each other through record information of a virtual golf game of each of a plurality of users who use the virtual golf system before the plurality of users accesses the system in order to play the virtual golf game, whereby it is possible to induce users' record competition in the virtual golf game and to provide the users with immersiveness and interest in the game.

Technical Solution

In accordance with an aspect of the present invention, the above and other objects can be accomplished by the provision of a virtual golf introduction image generation method including extracting various kinds of record information of a stored virtual golf game of a player who logs in to play the virtual golf game, extracting player introduction information to be included in an introduction image that provides information about the logged in player before the virtual golf game is started based on the extracted record information, calculating information about a skill title that representatively expresses golf skill of the player using record information of each of a plurality of predetermined skill items, among the various kinds of record information, extracting a comment matching with information about the calculated skill title as an introduction comment to be included in the introduction image from an information database configured to store comments that express the skill title, and providing an introduction image including the extracted player introduction information and the introduction comment.

The step of calculating the information about the skill title may include selecting a representative skill item that represents golf skill of the player from record information of each of a plurality of predetermined skill items about the player and determining the grade of the skill title of the player using record information about the representative skill item.

The step of selecting the representative skill item may include selecting a skill item corresponding to the highest score, among scores calculated by scoring of records according to the plurality of skill items, as the representative skill item, and the step of determining the grade of the skill title of the player may include determining the grade of the skill title of the player based on the difference between the score of the representative skill item and the score calculated by scoring of a skill grade that indicates the level of golf skill compared to all users registered with a system.

The information database that stores the comments that express the skill title may include information in which the plurality of predetermined skill items is set as title classifications and the comment about the skill title is set and stored for the skill title grade of each title classification, and the step of extracting the comment matching with information about the calculated skill title as the introduction comment may include extracting a comment corresponding to the determined skill title grade in the title classification corresponding to the selected representative skill item, among the title classifications, as the introduction comment.

The information database that stores the comments that express the skill title may include information in which the plurality of predetermined skill items is set as title classifications, the comment about the skill title is set and stored for the skill title grade of each title classification, and the comment is set and stored for each skill grade that indicates the level of golf skill compared to all users registered with a system within the skill title grade, and the step of extracting the comment matching with information about the calculated skill title as the introduction comment may include extracting a comment corresponding to the determined skill title grade and the skill grade of the player in the title classification corresponding to the selected representative skill item, among the title classifications, as the introduction comment.

In accordance with another aspect of the present invention, there is provided a virtual golf introduction image generation method including extracting, by a server, various kinds of record information of a stored virtual golf game of each of a plurality of players who log in through a client in order to play the virtual golf game and making a comparison in information between the players, selecting, by the server, two or more noteworthy players who are comparable to each other from among the players through the comparison in information between the players, and generating, by the client, an introduction image showing information of each of the selected two or more noteworthy players so as to be comparable to each other for each predetermined item.

The server may preset a plurality of player titles, priority of each player title, and a selection condition of each player title as a title showing the two or more noteworthy players so as to be comparable to each other, the step of selecting the two or more noteworthy players may include selecting one of the player titles according to the selection condition based on priority of the predetermined player titles through the comparison in information between the players and selecting two or more players corresponding to the selected player title, and the step of generating the introduction image may include assigning the selected player title to the introduction image and showing information for each predetermined item of each of the two or more players corresponding to the selected player title so as to be comparable to each other.

In accordance with another aspect of the present invention, there is provided a virtual golf player information calculation method including extracting various kinds of record information of a stored virtual golf game of a player who logs in to play the virtual golf game, calculating information about a skill title that representatively expresses golf skill of the player using record information of each of a plurality of predetermined skill items, among the various kinds of record information, and extracting and assigning a comment matching with information about the calculated skill title as a title comment that representatively expresses the golf skill of the player from an information database configured to store comments that express the skill title.

The step of calculating the information about the skill title may include selecting a representative skill item that represents golf skill of the player from the record information of each of the plurality of predetermined skill items comprising at least two selected from among an average driver carry distance, a fairway hit percentage, green in regulation, and putting average of the player, and determining a grade of the skill title of the player using record information about the representative skill item, and the step of extracting and assigning the comment matching with the information about the calculated skill title as the title comment may include extracting a comment corresponding to the determined skill title grade and the skill grade of the player in a title classification corresponding to the selected representative skill item, among the title classifications, as the title comment from information in which the plurality of predetermined skill items is set as title classifications and the title comment is set and stored for the skill title grade of each title classification and for each skill grade of the player registered with a system, as information stored in the information database.

In accordance with another aspect of the present invention, there is provided a virtual golf system including a server configured to store individual information, virtual golf skill grade information, and various kinds of record information of a virtual golf game of players registered with the system, and a client configured to communicate with the server and to provide a virtual golf game to the players, wherein the server extracts various kinds of record information of a stored virtual golf game of a player who logs in through the client, transmits the extracted record information to the client, calculates information about a skill title that representatively expresses golf skill of the player using record information of each of a plurality of predetermined skill items, among the various kinds of record information, extracts a comment matching with information about the calculated skill title as an introduction comment from an information database configured to store comments that express the skill title, and transmits the extracted comment to the client, and the client provides player introduction information extracted based on the record information of the player received from the server and the introduction comment in a state of being included in an introduction image that provides information about the logged in player before the virtual golf game is started.

In accordance with a further aspect of the present invention, there is provided a virtual golf system including a server configured to store individual information, virtual golf skill grade information, and various kinds of record information of a virtual golf game of players registered with the system, and a client configured to communicate with the server and to provide a virtual golf game to the players, wherein the server presets a plurality of player titles, priority of each player title, and a selection condition of each player title as a title showing the two or more noteworthy players so as to be comparable to each other, extracts various kinds of record information of a stored virtual golf game of players who log in through the client, selects one of the player titles according to the selection condition based on priority of the predetermined player titles through a comparison in information between the players, and selects two or more players corresponding to the selected player title, and the client generates and provides an introduction image that has the selected player title assigned thereto and that shows information for each predetermined item of each of the two or more players corresponding to the selected player title so as to be comparable to each other.

Advantageous Effects

A virtual golf system, a virtual golf introduction image generation method, and a virtual golf player information calculation method according to the present invention have effects in that it is possible to provide a separate introduction image showing two or more users so as to be comparable to each other through record information of a virtual golf game of each of a plurality of users who use the virtual golf system before the plurality of users accesses the system in order to play the virtual golf game, whereby it is possible to induce users' record competition in the virtual golf game and to provide the users with immersiveness and interest in the game.

BEST MODE

A virtual golf system, a virtual golf introduction image generation method, and a virtual golf player information calculation method according to the present invention will be described in detail with reference to the accompanying drawings.

First, the construction of a virtual golf system according to an embodiment of the present invention will be described with reference to FIGS. 1 and 2.

Figure 1:
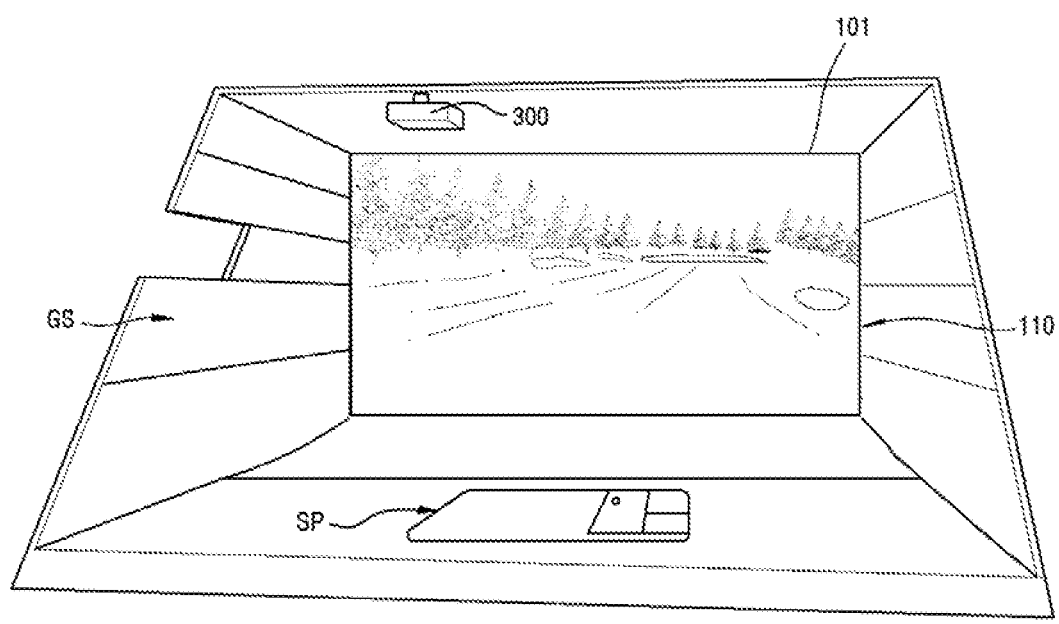
FIG. 1 is a view showing a virtual golf system according to an embodiment of the present invention.
Figure 2:
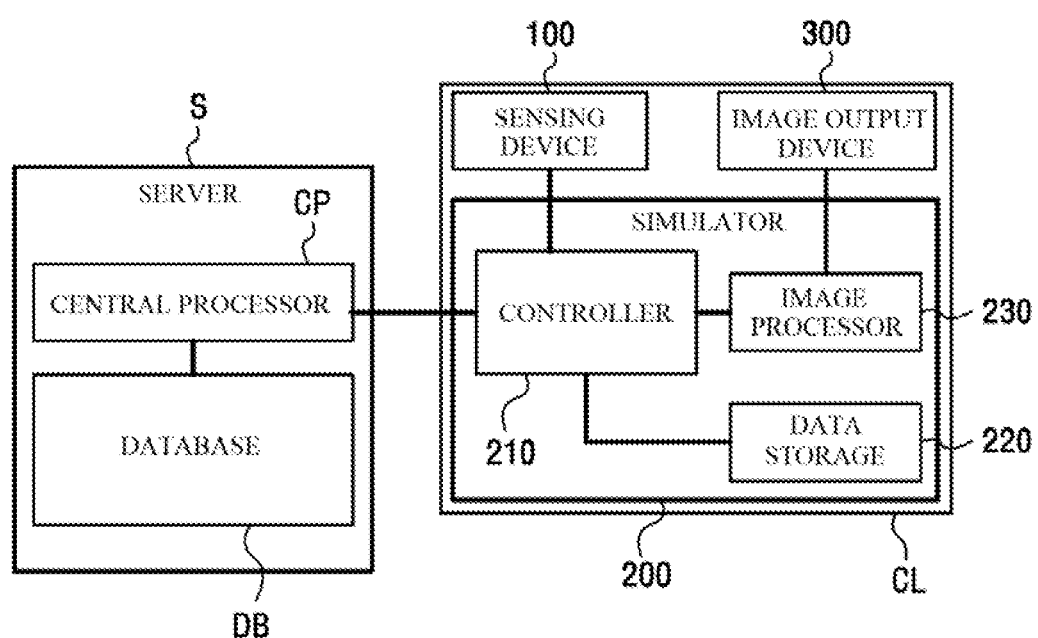
FIG. 2 is a block diagram showing the construction of the virtual golf system shown in FIG. 1.

FIG. 1 is a view showing a virtual golf system according to an embodiment of the present invention, and FIG. 2 is a block diagram showing the construction of the virtual golf system shown in FIG. 1.

The virtual golf system according to the present invention includes all types of golf systems that are configured to have a play mode in which a user, as a player, directly swings a golf club in order to hit a golf ball and that are configured such that the player takes a golf shot on a virtual golf course implemented as an image in order to play a golf game. A representative example of the virtual golf system is a screen golf system.

Hereinafter, the screen golf system will be described by way of example as the virtual golf system according to the present invention.

As shown in FIG. 1, the virtual golf system according to the embodiment of the present invention may be configured such that a shot plate SP, on which a user takes a golf swing, a golf mat, on which a golf ball to be hit by the user is placed, a screen 101, which is installed in front of the golf mat, and an image output device 300 configured to project an image 110 onto the screen 101 are provided in a predetermined space GS in which the user plays a virtual golf game, wherein the shot plate SP may be implemented as a swing plate configured to implement inclination corresponding to topography of a virtual golf course on an image.

As shown in FIGS. 1 and 2, the virtual golf system according to the embodiment of the present invention may be constituted by a network system including a server S and a client CL, wherein a plurality of clients CL is connected to the server G over a network such that each client CL communicates with the server S in order to transmit and receive data.

Each client CL constitutes a virtual golf system configured such that a single user or a plurality of users, e.g. two or more users, plays a virtual golf game, and may include a sensing device 100, a simulator 200, and an image output device 300, as shown in FIG. 2. As shown in FIG. 2, the server S may include a central processor CP and a database DB.

The sensing device 100, which is a device configured to sense motion of at least one of a golf club and a ball after the user takes a golf swing, captures and collects an image of a golf ball hit by the user as the result of taking a golf shot within an angle of view of a camera using the camera, performs analysis, such as image processing, on the collected image, calculates sensing information, such as motion parameters, about movement of the golf ball, and transmits the calculated sensing information to the simulator 200.

The simulator 200, which includes a controller 210, a data storage 220, and an image processor 230, is a means that is manipulated by the user to set a virtual golf simulation environment or that is manipulated by the user to adjust aiming during a round of virtual golf, wherein the simulator may be provided with a manipulation device (not shown).

The data storage 220 stores all data necessary to implement a virtual golf simulation image, data about a virtual golf course implemented by imaging an actual golf course, and data about topography information of the virtual golf course. Consequently, the data storage may provide data capable of implementing a virtual environment in which the user plays a round of virtual golf on a virtual golf course selected by the user.

The data storage 220 may be configured to store various data about a virtual golf course, or may be configured to receive various data about a virtual golf course from the server S over the network and to temporarily store the data about the virtual golf course.

The image processor 230 performs information processing to implement an image of the virtual golf course on a screen using the data about the virtual golf course stored in the data storage 220, and performs information processing to implement an image in which the trajectory of the golf ball hit by the user is simulated on the virtual golf course.

Image information processed by the image processor 230 is projected on the screen 101 through the image output device 300, which may be implemented by a projector, such that the user can view an image 110 projected on the screen 101.

The image processor 230 may be implemented as a modularized part of a standalone device configured to perform an image processing function, or may be implemented as a standalone device.

The controller 210, which is a component configured to control all processing for virtual golf simulation, performs various kinds of calculation and control to accomplish simulation in which a virtual ball is moving on the virtual golf course based on sensing information about the moving golf ball extracted according to the result of sensing by the sensing device 100 and a physical engine.

When a user who wishes to play a virtual golf game inputs login information through the simulator 200 of the client CL, the controller 210 transmits the information to the server S, and the central processor CP of the server S extracts data about the user and transmits the extracted data to the simulator 200.

Upon receiving the information about the logged in user from the server S, the simulator 200 is ready to play a virtual golf game using the information about the user. At this time, when a single user or each of a plurality of users logs in, an introduction image is generated using information about two or more users, and the generated introduction image is provided to the screen such that the user or the users are interested and immersed in a game.

The content of the introduction image when a single user logs in and the content of the introduction image when a plurality of users, e.g. two or more users, logs in may be configured to be different from each other. An example of an introduction image when a single user logs in is shown in FIG. 5.

Figure 5:
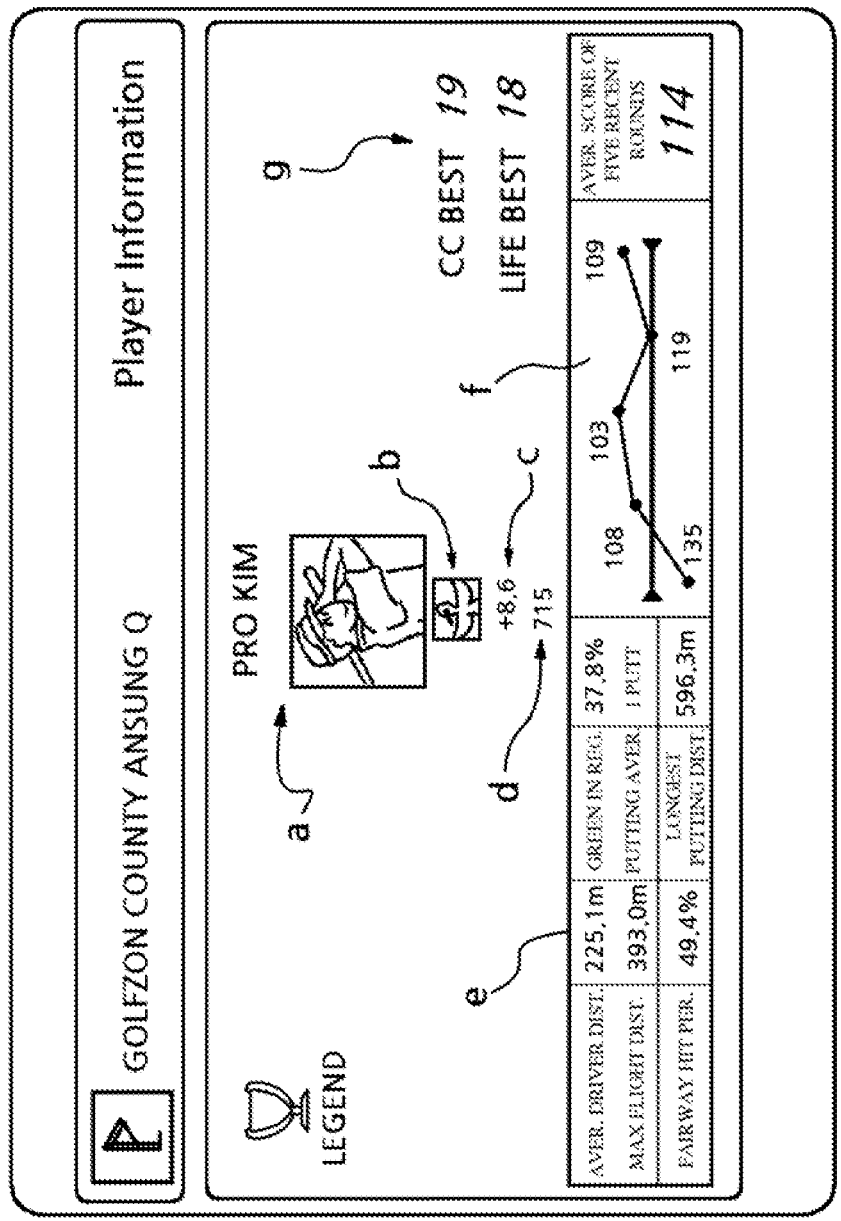
FIGS. 5 and 6 are views showing examples of introduction images, generated by the virtual golf introduction image generation method, used in the virtual golf system according to the embodiment of the present invention.

As shown in FIG. 5, a one-person introduction image may include individual registration information a, b, c, and d, record information e, record analysis information f, and interest information g of the logged in user.

The individual registration information may include individual information about the logged in user, such as nickname and nick image information a, skill grade information b, skill index (handicap) information c, and ranking information d.

The record information e may include statistical information about shot data in previous virtual golf games of the logged in user.

The record analysis information f may include analysis graph information about specific information, among previous record information of the logged in user.

The interest information g may include information in which the logged in user has a special interest, such as information on when the best grade was recorded, among previous record information of the logged in user, the best record information, among previous records obtained on a virtual golf course on which the logged in user wishes to play a game, and average record information about recent several games.

Since the one-person introduction image is generated and displayed on the screen before the user plays a virtual golf game, as described above, the user is interested in their records and is also immersed and interested in the game.

Meanwhile, in a player information provision method according to the present invention, at least two players are selected as particularly noteworthy players who are comparable to each other as the result of analysis of records, among two or more users, and an introduction image about the selected players is generated and displayed on the screen before the two or more users play a virtual golf game such that the users are interested in their game records.

Figure 3:
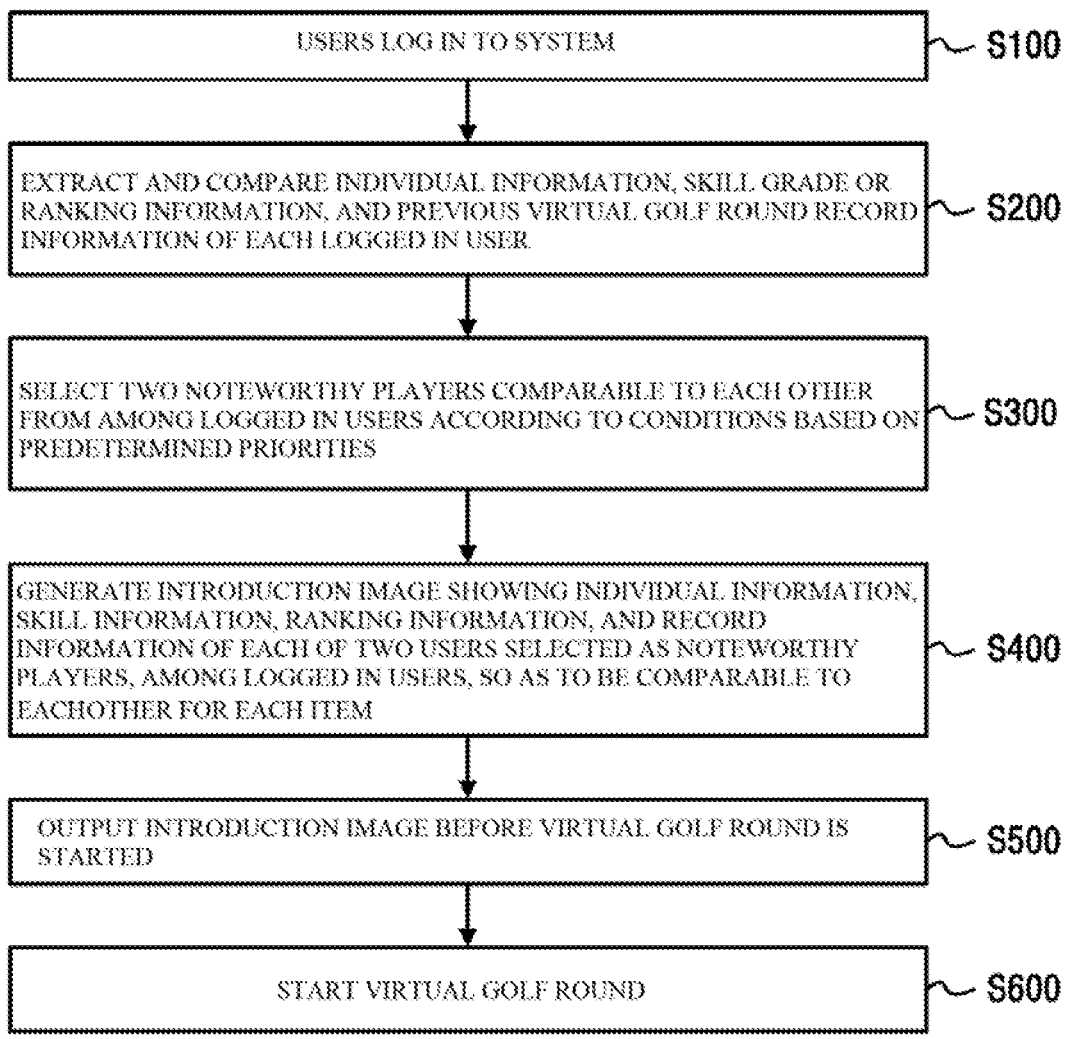
FIG. 3 is a flowchart illustrating the overall flow of an introduction image generation method of the virtual golf system according to the embodiment of the present invention.

More specifically, generation and output of the introduction image about the two or more users will be described with reference to the flowchart shown in FIG. 3. FIG. 3 is a flowchart illustrating a player information provision method using the virtual golf system according to the embodiment of the present invention.

As shown in FIG. 3, a plurality of users who wish to play a virtual golf game using the virtual golf system according to the embodiment of the present invention logs in to the system (S100).

The server extracts various kinds of necessary information on each of the logged in users, such as individual information, skill grade or ranking information, and previous virtual golf game record information, from the database and transmits the extracted information to the simulator of the client, and the controller of the simulator makes a comparison in information between the users using the received information (S200).

The controller makes a comparison between and an analysis of various kinds of information of the logged in users to select two noteworthy players who are comparable to each other from among the users according to conditions based on predetermined priorities (S300). The conditions based on the predetermined priorities will be described below in detail.

The controller performs control such that the image processor generates an introduction image showing individual information, skill information, ranking information, and record information of each of the two users selected as the noteworthy players, among the logged in users, so as to be comparable to each other for each predetermined item (S400) and outputs the introduction image to the screen or a separate display screen such that the introduction image is provided to the users before a virtual golf game is started (S500).

Upon viewing the introduction image, the users are interested in record improvement in the virtual golf game, and the virtual golf game is commenced in this state (S600).

A more concrete example of the player information provision method according to the embodiment of the present invention described above will be described with reference to FIG. 4.

Conditions for selecting two noteworthy players in a two-person introduction image generated for two or more users when the two or more users log in to the system in order to play a virtual golf game may be set as shown in Table 1 below.

TABLE 1

| Priority | Condition | Player title |
|---|---|---|
| First priority | Two players having the smallest difference, among players having differences within a predetermined score, based on the average score of five recent games (which may be calculated as information based on predetermined number of games without limit to five games) | Rival players |
| Second priority | Case in which there are one or more females in companions. A female player having the highest skill index and a male player having the minimum difference from the skill index of the female player, among male players having skill indices within a predetermined range | Key Man & Woman |
| Third priority | Two players having minimum difference in skill index from each other, among companions | Key players |

The conditions based on priorities are merely an example, and the present invention is not limited thereto. All conditions for selecting two noteworthy players may be included.

Also, in Table 1 above, setting is performed to select two noteworthy players irrespective of whether the number of logged in users is two, three, or four. However, the present invention is not limited thereto. Three noteworthy players or four noteworthy players may be selected.

Figure 4:
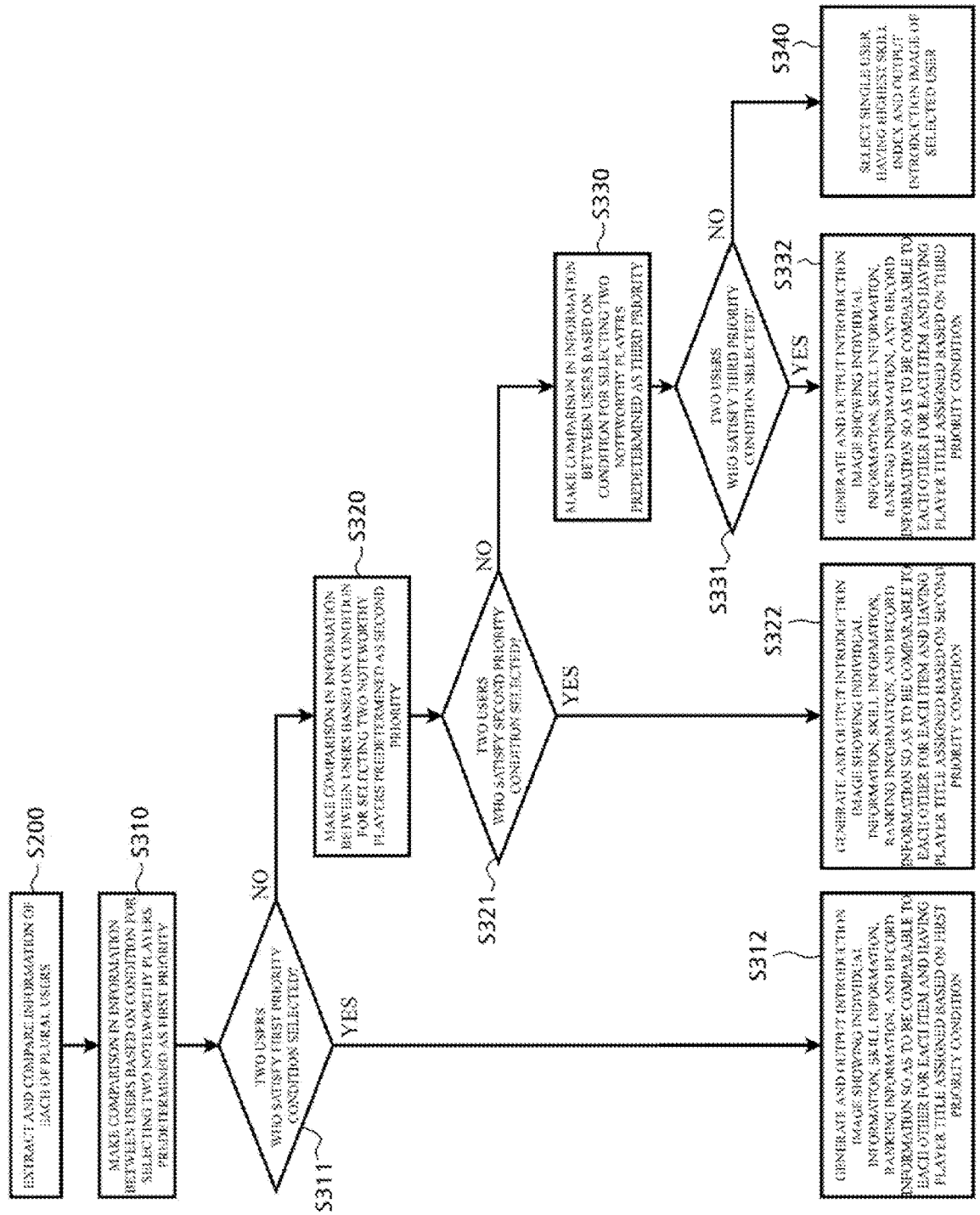
FIG. 4 is a flowchart illustrating a more detailed example of the flow of the virtual golf introduction image generation method according to the embodiment of the present invention shown in FIG. 3.

The flowchart shown in FIG. 4 will be described using the above conditions of the first priority, the second priority, and the third priority and the player title for each priority as an example.

After login of the plurality of users to the system and extraction of and comparison in information of the users (S200), first, the controller makes a comparison in information between the users based on the condition for selecting the two noteworthy players predetermined as the first priority (S310).

For example, in order to select the two noteworthy players as the "rival players" described above as the first priority, a selection process based on the above condition may be performed.

When two users who satisfy the first priority condition are selected (S311), an introduction image showing individual information, skill information, ranking information, and record information of each of the selected two users so as to be comparable to each other for each item and having a player title assigned based on the first priority condition (e.g. "rival players") is generated and output to the screen (S312).

If selection of two users who satisfy the first priority condition fails, the controller makes a comparison in information between the users based on the conditions for selecting the two noteworthy players predetermined as the second priority, which is the next priority (S320). When two users who satisfy the second priority condition are selected (S321), an introduction image showing individual information, skill information, ranking information, and record information of each of the selected two users so as to be comparable to each other for each item and having a player title assigned based on the second priority condition (e.g. "key man & woman") is generated and output to the screen (S322).

If selection of two users who satisfy the second priority condition fails, the controller makes a comparison in information between the users based on the conditions for selecting the two noteworthy players predetermined as the third priority, which is the next priority (S330). When two users who satisfy the third priority condition are selected (S331), an introduction image showing individual information, skill information, ranking information, and record information of each of the selected two users so as to be comparable to each other for each item and having a player title assigned based on the third priority condition (e.g. "key players") is generated and output to the screen (S332).

If selection of two users who satisfy any one of the priority conditions fails, the controller may select a single user having the highest skill index and may generate and output an introduction image of the selected user (see FIG. 5) (S340).

An example of the introduction image of the two noteworthy players described above is shown in FIG. 6.

Figure 6:
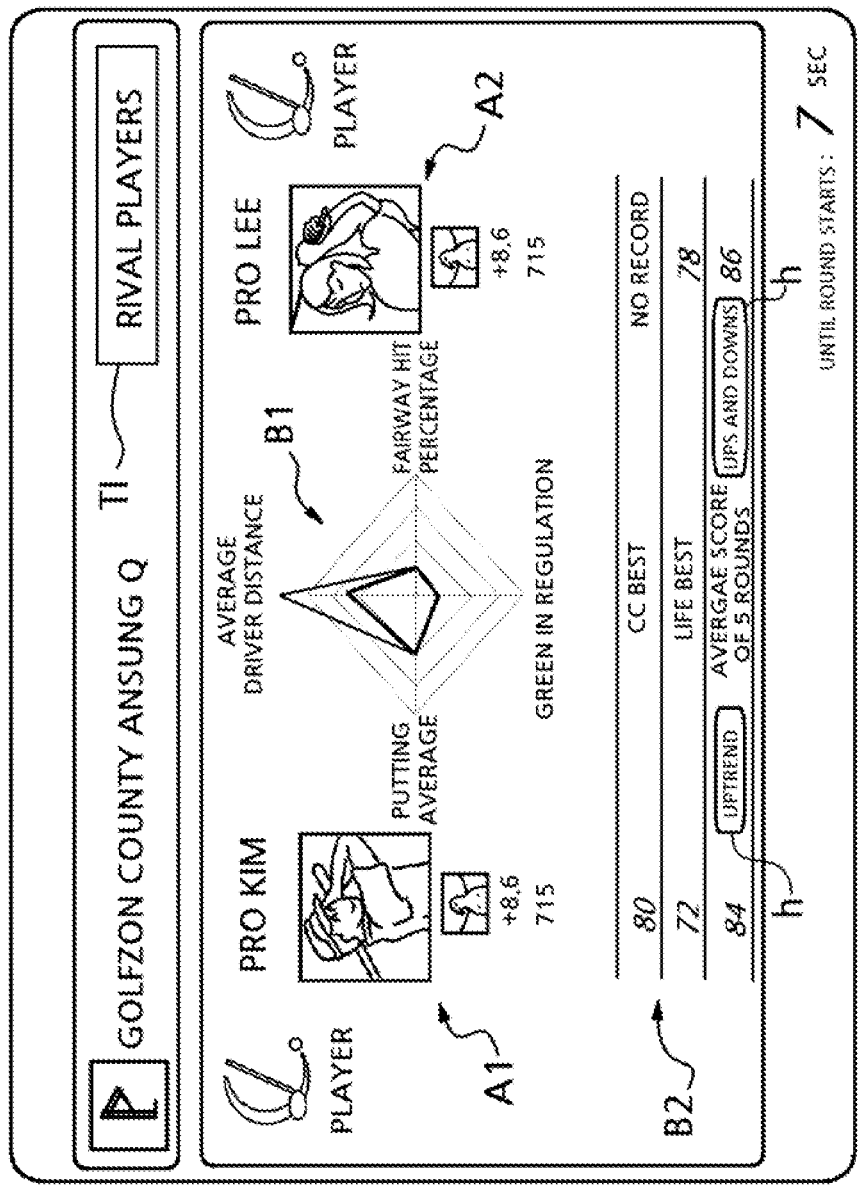

FIG. 6 shows an example of the introduction image of the two players having the player title "rival players", among the conditions for selecting the two noteworthy players described above.

Individual registration information A1 of one of the two selected players and individual registration information A2 of the other player may be displayed so as to be comparable to each other, and analysis graph information B1 calculated based on the analysis result of the record of each of the two selected players may be displayed as shown in FIG. 6.

Here, the individual registration information A1 or A2 may include nickname and nick image information a, skill grade information b, skill index (handicap) information c, and ranking information d, as described above in connection with the one-person introduction image (see FIG. 5).

As shown in FIG. 6, record comparison information B2 showing major record information of each of the two noteworthy players so as to be comparable to each other may be displayed in the two-person introduction image.

For example, as shown in FIG. 6, information h about a current play tendency may be displayed in the introduction image using comparison information of the best scores, among previous records on a virtual golf course on which a game will be currently played, comparison information of the best scores, among previous records, average record information in a predetermined number of recent games, and recent record information.

Preferably, the player title T1 of the two selected players may be provided at one side of the introduction image.

As described above, the virtual golf system according to the embodiment of the present invention and the player information provision method using the same have features in that, before a plurality of users who use virtual golf accesses the system and plays a virtual golf game, a separate introduction image of two or more users to be highlighted is provided so as to be comparable to each other through virtual golf game record information of each of the plurality of users, whereby it is possible to induce users' record competition in the virtual golf game and to provide the users with immersiveness and interest in the game.

Meanwhile, a virtual golf introduction image generation method and a virtual golf player information calculation method according to another embodiment of the present invention will be described in detail.

In general, when accessing information about a certain theme, people tend to pay attention to simply summarized information about the result of analysis of details of the theme, rather than all of the details of the theme.

In particular, when a certain evaluation target has various features, people tend to evaluate the evaluation target through an answer to a question "How would you define it in one word?", rather than paying attention to each of the features of the evaluation target. For golf, since kinds of golf clubs are various, kinds of golf shots are various, walk-through methods are various, and records based thereon are various, it is very difficult to define and evaluate golf skill of a certain golf player in one word.

When golf skill of a certain golf player is defined and expressed in one word, however, people may pay attention to the golf skill of the certain golf player expressed in one word.

For example, on the assumption that a certain golf player stably plays a short game while stably taking a driver shot and has remarkable records about carry distance of the driver shot and thus the player is evaluated as an "exciting long hitter with a strong swing!", other players who play a virtual golf game together with the evaluated player may communicate with the evaluated player in terms of the driver shot while the virtual golf game is played, whereby players' interest in virtual golf may be further improved.

The present invention starts from the point described above.

That is, in the present invention, record information of each of the players who play the virtual golf game is accurately analyzed, and a comment capable of representatively expressing golf skill of each of the players is derived and provided based on the result of analysis, whereby the players who play the virtual golf game are greatly interested in virtual golf.

More specifically, in the present invention, attention to several records capable of representing golf skill of a virtual golf player, among various kinds of previous record information, is paid, a title capable of representatively expressing golf skill of the player, i.e. a skill title, is assigned using the records, and a comment that expresses the assigned skill title is extracted from an information database and is then provided.

Here, a few records capable of representing golf skill of the virtual golf player, among various records of the virtual golf player, may be preset, and these records are defined and designated as a plurality of predetermined "skill items".

For golf, there may be "average driver carry distance", "fairway hit percentage", "green in regulation", and "putting average" as the representative skill items.

The "average driver carry distance" skill item indicates the average of carry distance records when the player takes driver shots during playing of the virtual golf game, and the "fairway hit percentage" skill item indicates the ratio of the number of times of landing on the fairway to the total number of shots, including driver shots and iron shots, taken by the player during playing of the virtual golf game.

The "green in regulation" skill item indicates the ratio of the number of on-green balls to the total shots when approach shots are taken at a predetermined distance from the green, and the "putting average" skill item indicates the average number of putts until the ball enters the hole cup in an on-green state.

The server of the virtual golf system according to the present invention stores information about various records of the virtual golf game of each of players registered with the system. Upon receiving a request from the client (when there is a player logged in through the client), the server may extract record information of each of a plurality of predetermined skill items described above using the information about various records of the player.

The server of the virtual golf system according to the present invention provides an information database in order to assign the logged in player a skill title that representatively expresses the golf skill of the player using the record information and to assign a comment based thereon.

In the information database, information is sorted and stored depending on title classifications, and each of the title classifications may correspond to the plurality of predetermined skill items.

That is, each of the skill items becomes the title classification. For example, "average driver carry distance", "fairway hit percentage", "green in regulation", and "putting average" may be set as the title classification, and information about a comment may be stored in a state of being sorted for each title classification.

Also, in each title classification, a comment about the skill title may be set and stored for a skill title grade of the player.

Here, the skill title grade is obtained by selecting a representative skill item that represents golf skill of a player from among record information of each of a plurality of predetermined skill items of the player and calculating the level of the skill title to be assigned to the player as a grade using record information of the representative skill item and information about the golf skill grade registered with the system of the player.

The golf skill grade, each skill item, and the skill title grade of the player may be scored and may be calculated by the numerical value of the score.

As described above, when title classification is performed by selecting the representative skill item of the player and the score of the skill title grade is calculated, a comment matching therewith may be calculated from the information database.

An example of the information database of comments based on the skill titles described above is shown in Table 2 to Table 5 below.

TABLE 2

| Skill title grade | Golf skill grade | Comment based on "average driver carry distance" title classification |
|---|---|---|
| 4 | 12 | Commonly acknowledged long hitting king! The secret is to pay, and watching is free of charge. |
| 4 | 11 | Number one for carry distance! Longest carry distance for each grade! |
| 4 | 10 | Possess eagle-level carry distance! New star for each grade |
| 4 | 9 | I am really a long hitting crane! |
| 3 | 12 | Hawk with eagle's mask! Long carry distance today, too |

TABLE 2-continued

| Skill title grade | Golf skill grade | Comment based on "average driver carry distance" title classification |
|---|---|---|
| 3 | 11 | Expect good result based on excellent driver |
| 3 | 10 | Long hitter! Expect one on for par 4 |

TABLE 3

| Skill title grade | Golf skill grade | Comment based on "fairway hit percentage" title classification |
|---|---|---|
| 4 | 12 | Have both carry distance and accuracy. Win this round, too. |
| 4 | 11 | Sophistication is weapon! Possess excellent fairway hit percentage |
| 4 | 10 | Possess eagle-level fairway hit percentage with prominent accuracy! |
| 4 | 9 | Expect good result in this round with excellent fairway hit percentage, too |
| 3 | 12 | Person who possess eagle-level driver accuracy |
| 3 | 11 | Expect good result in this round based on accurate fairway walkthrough |
| 3 | 10 | Sophistication makes score. Possess high fairway hit percentage |

TABLE 4

| Skill title grade | Golf skill grade | Comment based on "green in regulation" title classification |
|---|---|---|
| 4 | 12 | Rule this round with extreme green in regulation |
| 4 | 11 | Buddy change at every on green! Person who possesses high green in regulation |
| 4 | 10 | Possess eagle-level green in regulation with good score |
| 4 | 9 | Player who has really good green in regulation! This round expected |
| 3 | 12 | Good score results from good green in regulation like me |
| 3 | 11 | Expect good score in this round! Possess high-level green in regulation |
| 3 | 10 | Reduce score through consistent shots! Possess high green in regulation |

TABLE 5

| Skill title grade | Golf skill grade | Comment based on "putting average" title classification |
|---|---|---|
| 4 | 12 | Drive is a show, and putt is money. Attention! God of putting appears |
| 4 | 11 | Putting master representing every grade! I lead this round |
| 4 | 10 | Putting is already eagle-level! Expect good result in this round |
| 4 | 9 | Possess excellent putting ability! Dark horse in this round |
| 3 | 12 | Lead this round with outstanding putting ability |
| 3 | 11 | Power to reduce score! Expect good result by putting in this round, too |
| 3 | 10 | Player who has putting ability higher than crane level |

Here, the "golf skill grade", which indicates the level of golf skill of the player compared to all of the users registered with the system, is calculated by comprehensively evaluating various items, such as score information of a virtual golf game, record information, and career, and the server matches a comment about the player using a score calculated by scoring the gold skill grade of each player.

A skill item corresponding to the highest score, among scores calculated by scoring of records according to the plurality of skill items, may be selected as a representative skill item, and the skill title grade may be determined by the difference between the score of the representative skill item and the score of the golf skill grade.

A comment matching the skill title may be retrieved and extracted from the information database using information about the golf skill grade, the representative skill item, the skill title grade of the player, and the extracted comment may be used as a "title comment", which is an expression representatively indicating the golf skill of the player, before a virtual golf game is started, during playing of the virtual golf game, after the virtual golf game is finished, or in various communities provided by the server.

In particular, the comment is used when the virtual golf introduction image according to the present invention is generated such that players are considerably interested in the virtual golf game before the virtual golf game is started. A comment used in the introduction image is called an "introduction comment", and comments used in various cases described above are called "title comments".

Generation of an introduction image using the "introduction comment" will be described below.

Meanwhile, the above contents will be described by way of example in the case of player A, player B, and player C. Skill item information of the players is shown in Table 6 below.

TABLE 6

|  | Player A | Player B | Player C |
| --- | --- | --- | --- |
| Golf skill grade | 12 | 10 | 10 |
| Average driver carry distance | 16 | 8 | 10 |
| Fairway hit percentage | 9 | 9 | 13 |
| Green in regulation | 8 | 12 | 8 |
| Putting average | 7 | 10 | 7 |
| Representative skill item | Average driver carry distance | Green in regulation | Fairway hit percentage |
| Skill title grade (Representative skill item - Golf skill grade) | 16 − 12 = 4 | 12 − 9 = 3 | 13 − 10 = 3 |

It is assumed that scores obtained by scoring based on record information about the "golf skill grade" item, the "average driver carry distance" item, the "fairway hit percentage" item, the "green in regulation" item, and the "putting average" item of each of player A, player B, and player C are the same as shown in Table 6 above.

The representative skill item may be selected as the skill item having the highest score, among skill items indicated by scores. In the example of Table 6 above, the "average driver carry distance" item having the highest score may be selected as the representative skill item of player A, the "green in regulation" item may be selected as the representative skill item of player B, and the "fairway hit percentage" item may be selected as the representative skill item of player C.

The skill title grade may be calculated as the difference between the score of the representative skill item and the score of the golf skill grade. In the example of Table 6 above, the skill title grade of player A may be calculated to be 4, the skill title grade of player B may be calculated to be 3, and the skill title grade of player C may be calculated to be 3.

The title comments of the players may be determined based on the information database illustrated in Table 2 to Table 5 above by calculating the golf skill grade, the skill title grade, and the representative skill item of each player, as described above. These are shown in Table 7 below.

TABLE 7

|  | Player A | Player B | Player C |
| --- | --- | --- | --- |
| Golf skill grade | 12 | 9 | 10 |
| Skill title grade | 4 | 3 | 3 |
| Title comment | Commonly acknowledged long hitter! The secret is to pay, and watching is free of charge. | Green in regulation is already crane level! | Sophistication makes score. Possess high fairway hit percentage |

The above title comment is a comment according to the skill title representing the golf skill of each player, and may be used in various cases, as described above. The virtual golf player information calculation method according to the embodiment of the present invention is a method of calculating the title comment described above.

Meanwhile, the title comment about each player described above, which is input by a server manager in advance, is assigned to a player who enjoys virtual golf as a kind of evaluation about the skill. If the same comment is assigned every time, interest of the player may be lowered.

Consequently, the server of the virtual golf system according to the present invention prepares for various versions of comments for the comment corresponding to the same grade for each title classification in advance, and assignment of the comments is changed, e.g. comments are sequentially assigned, whenever a virtual golf game is played in order to further improve interest of the player.

An example of preparing for various versions of comments for the same title classification in advance, as described above, is shown in Table 8 below.

TABLE 8

| Skill title grade | Golf skill grade | Comment based on "average driver carry distance" title classification | |
| --- | --- | --- | --- |
| | | First version | Second version |
| 4 | 12 | Commonly acknowledged long hitting king! The secret is to pay, and watching is free of charge. | Tremendous driver! The secret is to pay, and watching is free of charge. |

TABLE 8-continued

| Skill title grade | Golf skill grade | Comment based on "average driver carry distance" title classification | |
|---|---|---|---|
| | | First version | Second version |
| 4 | 11 | Number one for carry distance! Longest carry distance for each grade! | Driver master! Long hitting king for each grade |
| 4 | 10 | Possess eagle-level carry distance! New star for each grade | No grade is needed! Long hitter having eagle-level carry distance! |
| 4 | 9 | I am really a long hitting crane! | Hey! I am a long hitting crane! |
| 3 | 12 | Hawk with eagle's mask! Long carry distance today, too | Is driver a show? I will show a hot show!! |
| 3 | 11 | Expect good result based on excellent driver | Today's watching point: Carry distance show of absolute master!! |
| 3 | 10 | Long hitter! Expectone on for par 4 | Hawk with eagle's mask! I will show upset carry distance! |

In the above example, in the case in which the server assigns a first version of comment to the same player and confirms information indicating that the first version of comment was assigned to the player when a virtual golf game is played again, at this time, the server may assign a second version of comment to the player under the same condition, whereby interest of the player may be further improved.

Also, in the case in which there are two or more players corresponding to the same comment information, different versions of comments may be assigned to the two or more players, rather than providing the same comment to the two or more players.

Meanwhile, a virtual golf introduction image generation method according to another embodiment of the present invention using the title comment extraction method, i.e. the virtual golf player information calculation method, described above will be described with reference to FIGS. 7 and 8.

Figure 7:
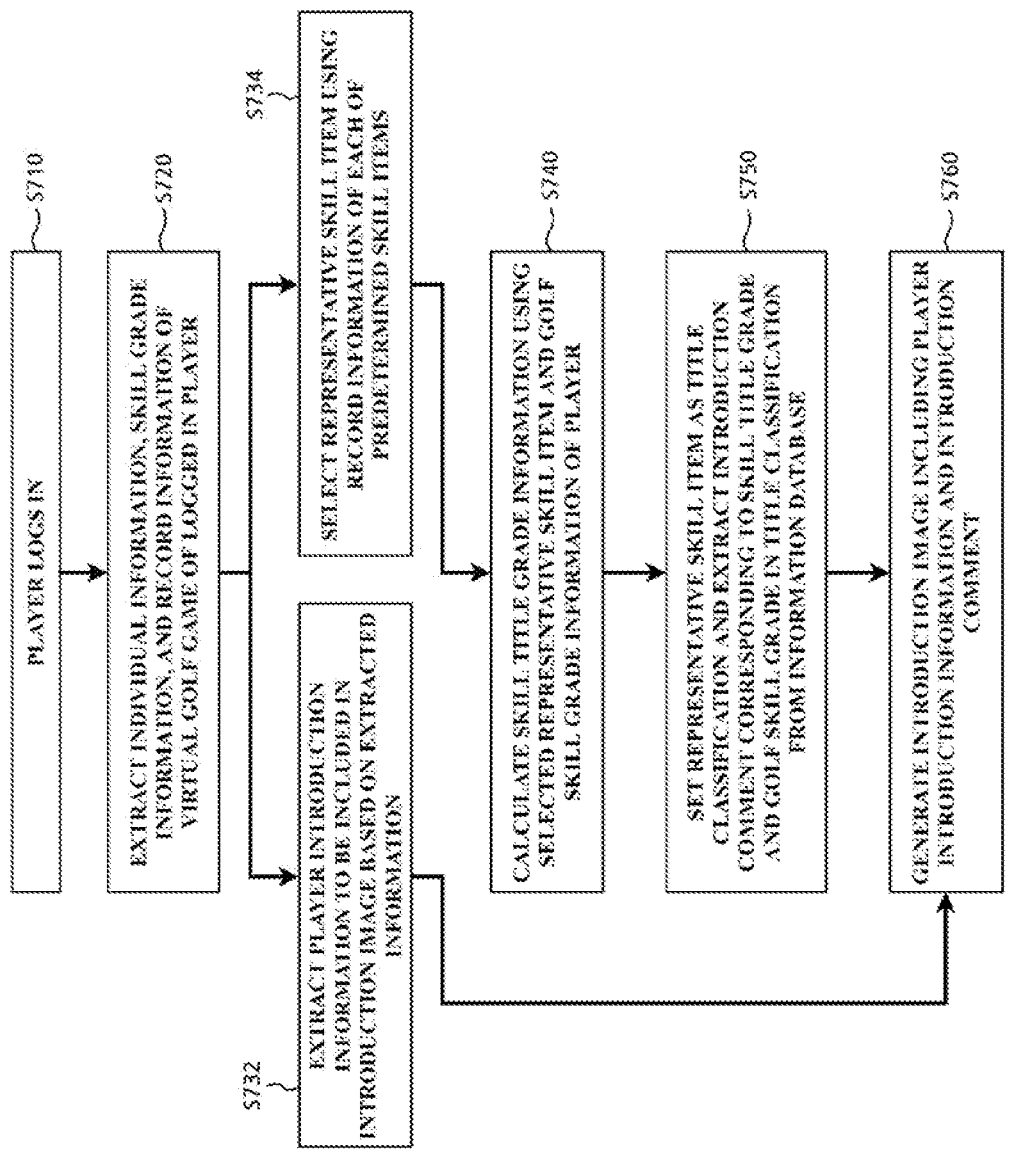
FIG. 7 is a flowchart of a virtual golf introduction image generation method according to another embodiment of the present invention.
Figure 8:
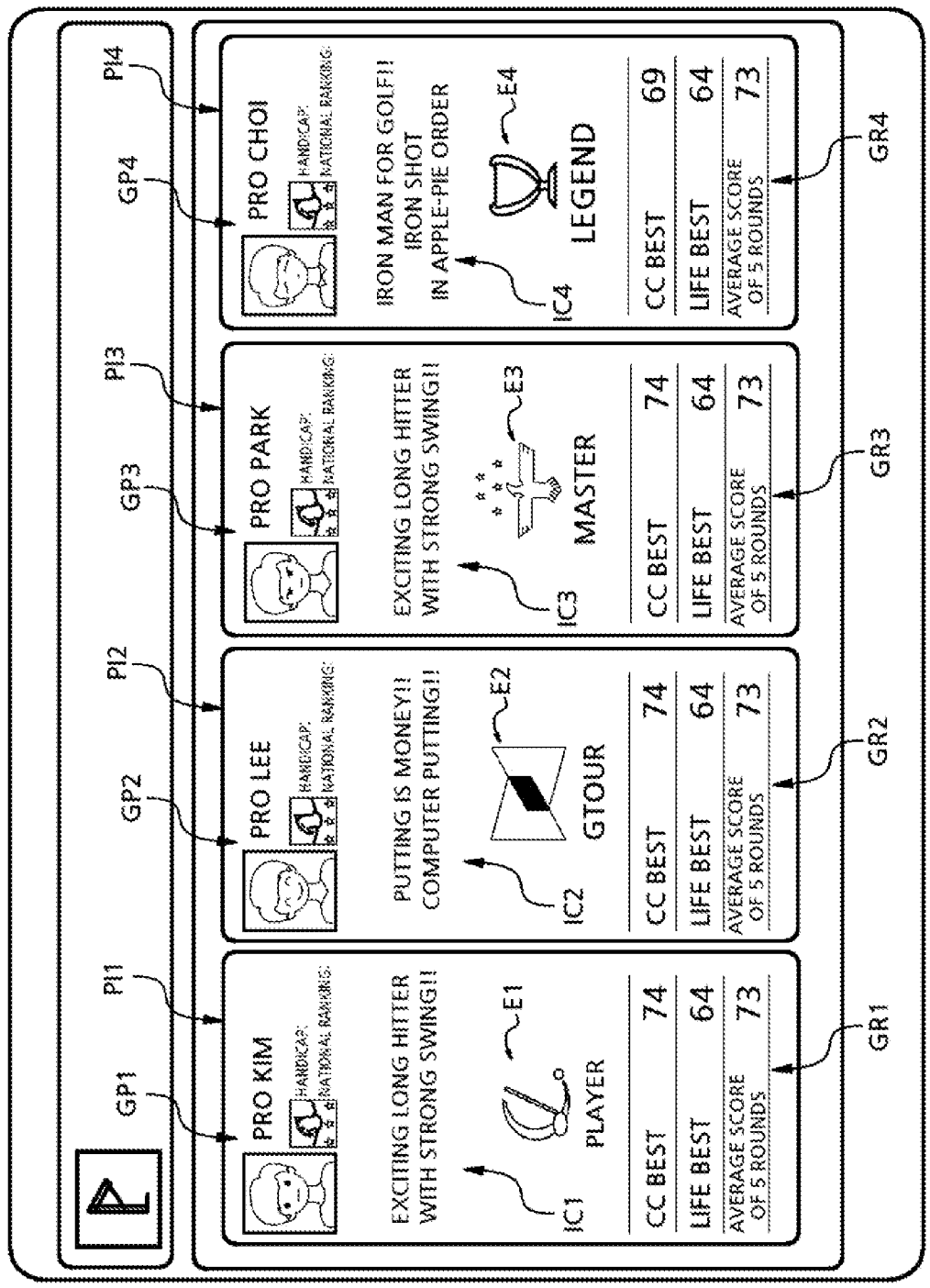
FIG. 8 is a view showing an example of an introduction image generated by the virtual golf introduction image generation method according to the other embodiment of the present invention.

FIG. 7 is a flowchart of a virtual golf introduction image generation method according to another embodiment of the present invention, and FIG. 8 is a view showing an example of an introduction image generated by the virtual golf introduction image generation method according to the other embodiment of the present invention.

When one player or two or more players log in through the client in order to play a virtual golf game (S710), the server requests login of each player from the client, and, when login is performed, the server extracts information necessary to play the virtual golf game, such as individual information of the logged in player, skill grade information of the logged in player, and record information of the virtual golf game of the logged in player (S720).

The server may extract player introduction information to be included in an introduction image based on the information extracted in step S720, or the server may transmit the information extracted in step S720 to the client, and the client may extract player introduction information based on the transmitted information (S732).

Meanwhile, the server or the client selects a representative skill item using record information of each of a plurality of predetermined skill items, among the information extracted in step S720 (S734).

The plurality of predetermined skill items may include at least two selected from among, for example, "average driver carry distance", "fairway hit percentage", "green in regulation", and "putting average", and an item having the highest score, among scores of the skill items, may be selected as the representative skill item, as previously described.

The server or the client may calculate skill title grade information using the selected representative skill item and golf skill grade information of the player (S740). For example, when the "average driver carry distance" is selected as the representative skill item, the difference between the score thereof and the score of the golf skill grade information of the player may be calculated as the skill title grade.

As described above, the server or the client sets the plurality of skill items as title classifications, stores information about a comment representatively expressing the golf skill of the player corresponding to the skill title and the skill grade for the skill title grade and the golf skill grade of each title classification in the form of a database, sets the representative skill item selected in step S734 from the stored information database as the title classification, and extracts a comment corresponding to the skill title grade and the golf skill grade in the title classification calculated in step S740 as an "introduction comment" to be included in an introduction image (S750).

The server or the client may generate an introduction image including the player introduction information generated in step S732 and the introduction comment generated in step S750 and may provide the generated introduction image to the screen before the virtual golf game is started (S760).

Steps S710 to S750 shown in FIG. 7 may be performed for each player when a plurality of players logs in, or may be performed only for player(s) who satisfy a predetermined basic requirement (e.g. player(s) who played two or more virtual golf games in the past).

An example of the introduction image is shown in FIG. 8. FIG. 8 shows the case in which player introduction information PI1 to PI4 of four players is included.

The player introduction information PI1 to PI4 may include image information, such as a photograph or avatar of each player, individual information GP1 to GP4, such as ranking, skill, and handicap information, and game record information GR1 to GR4, such as the best record on a golf course on which a game is to be played, the best record on all golf courses on which games were played, and the average record of five recent games, and images E1 to E4 capable of symbolizing golf skills of the respective players may be assigned by the server and the client so as to be displayed together therewith.

Also, as previously described, introduction comments IC1 to IC4 generated for the respective players may be displayed and provided as expressions representing the golf skills of the respective players.

As described above, an introduction comment representatively expressing golf skill of each player is provided through an introduction image before a plurality of players plays a virtual golf game, whereby the players may communicate with each other using the comments and greater interest may be induced during playing of the virtual golf game.

Meanwhile, in FIG. 8, the same comment of the same title classification is assigned to "Pro KIM" and "Pro PARK". In this case, however, a plurality of versions of comment information may be provided for the same grade in the same title classification, as previously described, and in the case in which two or more players correspond to the same title classification and the same grade when introduction comments are determined for a plurality of players, different versions of comments may be assigned to the players such that an introduction comment is recognized as a unique comment of each player.

INDUSTRIAL APPLICABILITY

A virtual golf system, a virtual golf introduction image generation method, and a virtual golf player information calculation method according to the present invention are applicable to industries related to golf practice and industries related to so-called screen golf, in which golf simulation based on virtual reality is implemented as an image, whereby a user may enjoy a round of virtual golf.

The invention claimed is:

1. A computer implemented method for providing a virtual golf introduction image generated by a virtual golf system as a network system including a server and a client allowing one or more players to play virtual golf in a way that provides an image for results when the player takes golf shots, wherein the server stores information on records of the virtual golf for each of the players, the method processed by the server comprising:
   acquiring, by a camera, images of a golf ball hit by each player and transmitting information of the images to a simulator of the client, the simulator configured to calculate motion parameters of the golf ball based on the images and store the calculated motion parameters in the client;
   transmitting, by the client, the calculated motion parameters of the golf ball of each player who logs in to play virtual golf through client to the server;
   extracting, by the server, the records including at least two selected from among an average driver carry distance, a fairway hit percentage, a green in regulation and a putting average of each player based on the calculated motion parameters as skill items with respect to each player who logs in to play virtual golf through the client;
   selecting, by the server, a representative skill item that represents golf skill of each player from the records of at least two selected skill items, wherein the server sets a skill title grade that defines each player's golf skill according to the records of each player's virtual golf for each title classification which is corresponding to each of the skill items;
   determining, by the server, the skill title grade of each player using the record of the selected representative skill item, wherein the server sets comments expressing the player's golf skill for each title classification according to the skill title grade;
   extracting, by the server, a comment matching the characteristic of the player's golf skill at the determined player's skill title grade as an introduction comment;
   extracting, by the server, player introduction information to be included in the virtual golf introduction image that provides information about the logged in player before the virtual golf is started based on the extracted record; and
   providing, by the client, the virtual golf introduction image including the extracted player introduction information and the extracted introduction comment.

2. The virtual golf introduction image generation method according to claim 1, wherein
   the step of selecting the representative skill item comprises selecting a skill item corresponding to a highest score, among scores calculated by scoring of records according to the plurality of skill items, as the representative skill item, and
   the step of determining the grade of the skill title of the player comprises determining the grade of the skill title of the player based on a difference between a score of the representative skill item and a score calculated by scoring of a skill grade that indicates a level of golf skill compared to all users registered with a system.

3. The virtual golf introduction image generation method according to claim 1, wherein the server is configured to set and store the comments expressing the player's golf skill
   for each skill grade that indicates a level of golf skill compared to all users registered with a system within the skill title grade, and
   step of extracting the comment matching with information about the calculated skill title as the introduction comment comprises extracting a comment corresponding to the determined skill title grade and the skill grade of the player in the title classification corresponding to the selected representative skill item, among the title classifications, as the introduction comment.

4. A virtual golf system comprising:
   a computing device having a memory configured to store program instructions and one or more processors coupled to the memory, comprising:
   a server configured to store individual information, virtual golf skill grade information, and information on records of a virtual golf for each of players; and
   a client configured to communicate with the server and to provide the virtual golf to the players, comprising:
      a camera configured to acquire images of a golf ball hit by each player;
      a simulator configured to receive the images, calculate motion parameters based on the images, and store the calculated motion parameters in the client,
   wherein
   the server is configured to
      extract the records including at least two selected from among an average driver carry distance, a fairway hit percentage, a green in regulation and a putting average of each player based on the calculated motion parameters as skill items with respect to each player who logs in to play the virtual golf through the client, select a representative skill item that represents golf skill of each player from the records of at least two selected skill items, wherein the server sets a skill title grade that defines each player's golf skill according to the records of each player's virtual golf for each title classification which is corresponding to each of the skill items, determine the skill title grade of each player using the record of the selected representative skill item, wherein the server sets comments expressing the player's golf skill for each title classification according to the skill title grade, extract a comment matching the characteristic of the player's golf skill at the determined player's skill title grade as an introduction comment, and extract player introduction information to be included in the virtual golf introduction image that provides information about the logged in player before the virtual golf is started based on the extracted record, and the client is configured to provide the virtual golf introduction image including the extracted player introduction information and the extracted introduction comment.

* * * * *